US011663010B2

(12) United States Patent
Beale et al.

(10) Patent No.: US 11,663,010 B2
(45) Date of Patent: May 30, 2023

(54) SYSTEM AND METHOD FOR SECURELY DEBUGGING ACROSS MULTIPLE EXECUTION CONTEXTS

(71) Applicants: Andrew Ward Beale, Irvine, CA (US); David Strong, Irvine, CA (US)

(72) Inventors: Andrew Ward Beale, Irvine, CA (US); David Strong, Irvine, CA (US)

(73) Assignee: UNISYS CORPORATION, Blue Bell, PA (US)

( * ) Notice: Subject to any disclaimer, the term of this patent is extended or adjusted under 35 U.S.C. 154(b) by 0 days.

(21) Appl. No.: 17/194,511

(22) Filed: Mar. 8, 2021

(65) Prior Publication Data

US 2022/0283815 A1     Sep. 8, 2022

(51) Int. Cl.
*G06F 9/30*      (2018.01)
*G06F 11/22*     (2006.01)
*G06F 11/26*     (2006.01)

(52) U.S. Cl.
CPC ...... *G06F 9/30181* (2013.01); *G06F 11/2236* (2013.01); *G06F 11/26* (2013.01)

(58) Field of Classification Search
CPC ... G06F 9/30181; G06F 11/2236; G06F 11/26
USPC .......................................................... 712/227
See application file for complete search history.

(56) References Cited

U.S. PATENT DOCUMENTS

| | | | |
|---|---|---|---|
| 7,546,444 B1* | 6/2009 | Wolrich | G06F 9/30098 712/228 |
| 7,996,663 B2* | 8/2011 | Stillwell, Jr. | G06F 9/462 712/228 |
| 8,266,629 B2* | 9/2012 | Inoue | G06F 9/544 718/1 |
| 8,725,993 B2* | 5/2014 | Abernathy | G06F 9/3851 712/220 |
| 2003/0226001 A1* | 12/2003 | Moyer | G06F 9/30134 712/228 |
| 2021/0048991 A1* | 2/2021 | Tanner | G06F 17/153 |
| 2021/0064525 A1* | 3/2021 | Tian | G06F 12/1081 |

* cited by examiner

*Primary Examiner* — Chun Kuan Lee

(57) ABSTRACT

A system and method for a virtual processor base/virtual execution context arrangement. The disclosed arrangement utilizes chiplets comprising core logic and defined instruction sets. The chiplets are adapted to operate in conjunction with one or more active execution contexts to enable the execution of particular processes. In particular, the defined instruction sets includes a instructions for processor debugging. The system and method support the compartmentalization of such debugging instructions so as to provide enhanced processor and process security.

18 Claims, 15 Drawing Sheets

US 11,663,010 B2

SYSTEM AND METHOD FOR SECURELY DEBUGGING ACROSS MULTIPLE EXECUTION CONTEXTS

BACKGROUND OF THE INVENTION

In the field of microprocessor system architecture and design, maximizing the utilization of the processing capabilities of a given processor core is a crucial with respect to the performance and productivity of a computing system. One of the most widely utilized approaches to accomplish this goal is the utilization of microprocessor systems that employ simultaneous multithreading ("SMT") an architecture that enables a single core to intelligently process two separate tasks or "threads" simultaneously.

FIG. 1A provides a simplified representation of a single-core microprocessor system 100 that utilizes SMT. As shown, in a first configuration core logic 102 is switchably linked (104) to register grouping A (106) and data path 108. Register grouping A stores instructions and data defining a first processor state for microprocessor system 100. Core logic 102 then utilizes its internal resources (e.g., Adder, Arithmetic Logic Unit) to process instructions and data, acquired from register grouping A, and returns results of the processing to register grouping A via data path 110. As internal resources within core logic 102 become available to accept instructions and data from register grouping B (112) (a condition that can occur while other internal resources of core logic 102 are still processing the instructions/data acquired from register grouping A), core logic is switchably linked (104) to register grouping B (112) (see FIG. 1B). register grouping B stores instructions and data defining a second processor state for microprocessor system 100. As shown, in this second configuration, core logic 102 is linked (104) to register grouping B(112) and data path 114 to permit the fetching of instructions and data from register grouping B. The available internal resources of core logic 102 can then process the instructions and data acquired from register grouping B (returning processing results to register grouping B via data path 116). The selective utilization of Register groupings A and B by single-core microprocessor system 100 enables the internal resources of core logic 102 to appear to be simultaneously processing instructions and data acquired from both register groupings (simultaneous multi-thread processing).

Although SMT processing enables a single physical processor to perform as if there were two separate logical processors within the microprocessor system, SMT is still constrained by the physical limitations of the associated register groupings (register groupings A and B in the above example). Within a given microprocessor, these associated register groupings are physical register groupings fabricated within the same monolithic semiconductor structure as the core logic. These physical register groupings have a fixed size and structure that dictate the amount of data that may be stored within them, and the manner in which such data can be stored and/or accessed. These register groupings are fixed, physical semiconductor structures within the microprocessor and cannot be modified or reconfigured. In addition, the processor's instruction set which defines how these fixed register groupings are addressed and accessed is also static, and cannot be reconfigured or altered.

The physical register groupings within modern microprocessors can each consist of a large number of individual registers. These sizable register groupings, combined with the static nature of the instruction for accessing the register groupings, typically result in a significant number of clock cycles being required for a given set of instructions or data to be acquired from the register grouping architecture and provided to a logic core. The larger the register grouping, the greater the possible clocking delay and consequential loss of processor efficiency.

Consequently, there exists a need for a system and method that provides the ability, at run-time, to dynamically define the configuration, capacity, and other aspects of the register files associated with one or more logic cores, and to provide the proper context to enable any associated logic core to access and execute the information contained in the dynamic register files, thereby achieving increased processing speed and efficiency.

BRIEF SUMMARY OF THE INVENTION

A system and method for a virtual processor base/virtual execution context arrangement. The disclosed arrangement utilizes chiplets comprising core logic and defined instruction sets. The chiplets are adapted to operate in conjunction with one or more active execution contexts to enable the execution of particular processes. In particular, the defined instruction sets include instructions for processor debugging. The system and method support the compartmentalization of such debugging instructions so as to provide enhanced processor and process security.

BRIEF DESCRIPTION OF THE DRAWINGS

The aspects, and advantages of the present invention will become better understood with regard to the following description, appended claims, and accompanying drawings in which:

DETAILED DESCRIPTION

Figure 2:
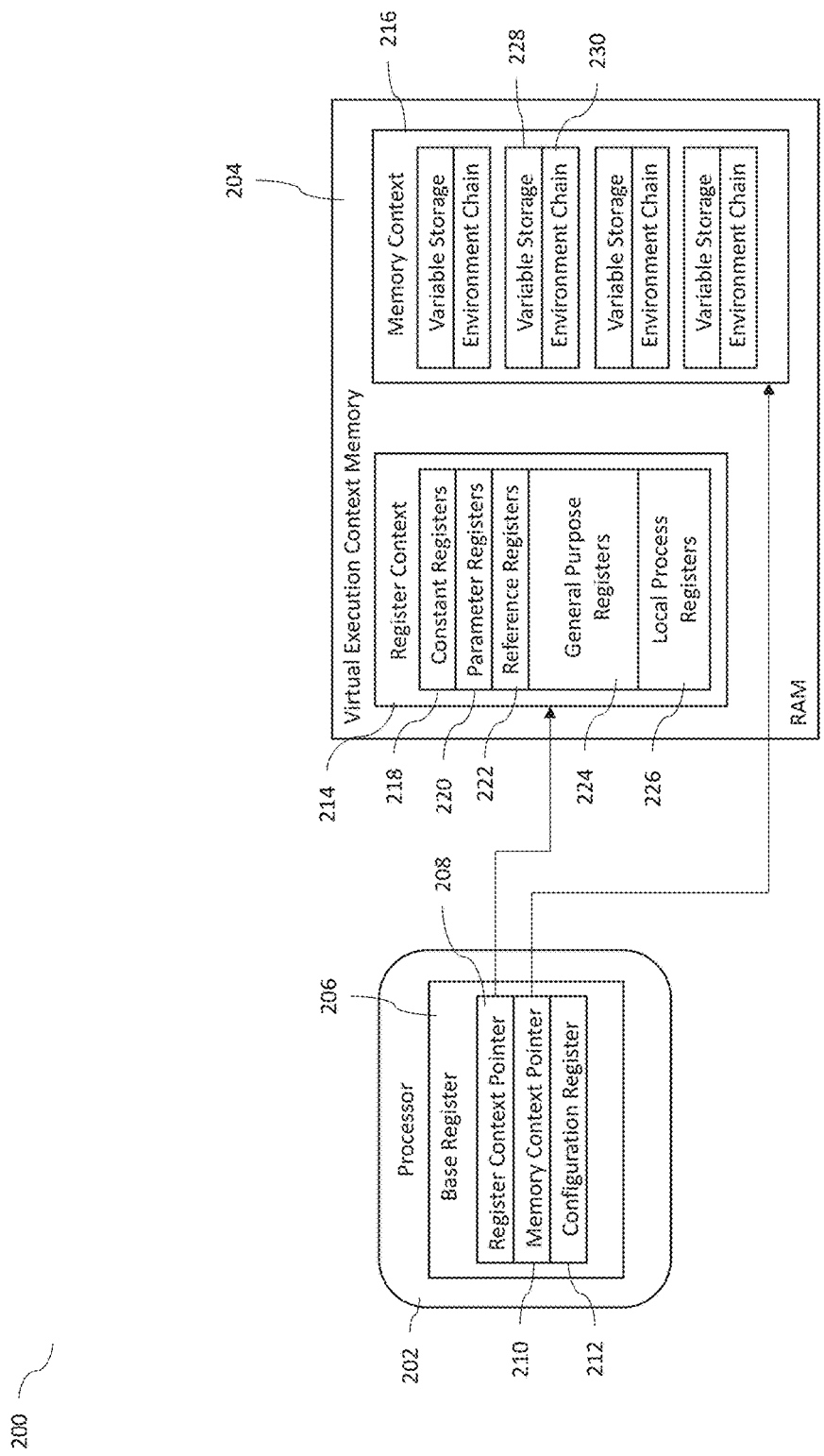
FIG. 2 is a functional block diagram of a processor and memory arrangement supporting a preferred embodiment of a system and method utilizing dynamic register files.

FIG. 2 is a functional block diagram of a processor and execution memory system (200) supporting a preferred embodiment of a system and method utilizing dynamic register files. As shown, system 200 consists of processor 202 and virtual execution context memory 204. Processor 202 includes base register contexts 206, register context pointer 208, memory context pointer 210, configuration register 212. Virtual execution context memory 204 is defined by software in a configurable random-access memory storage system, such as a DRAM or SRAM. The execution context memory stores information indicative of a register context (214) and an associated or paired memory context (216). Register context information 214 can include information typically associated with defining a processor state (i.e., processing a given thread), such as constant registers 218, parameter registers 220, reference registers 222, general purpose registers 224 and local process registers 226. Similarly, memory context information 216 within execution context memory 204 can include information such as variable storage information 228 and environment chain information 230.

Figure 1A:
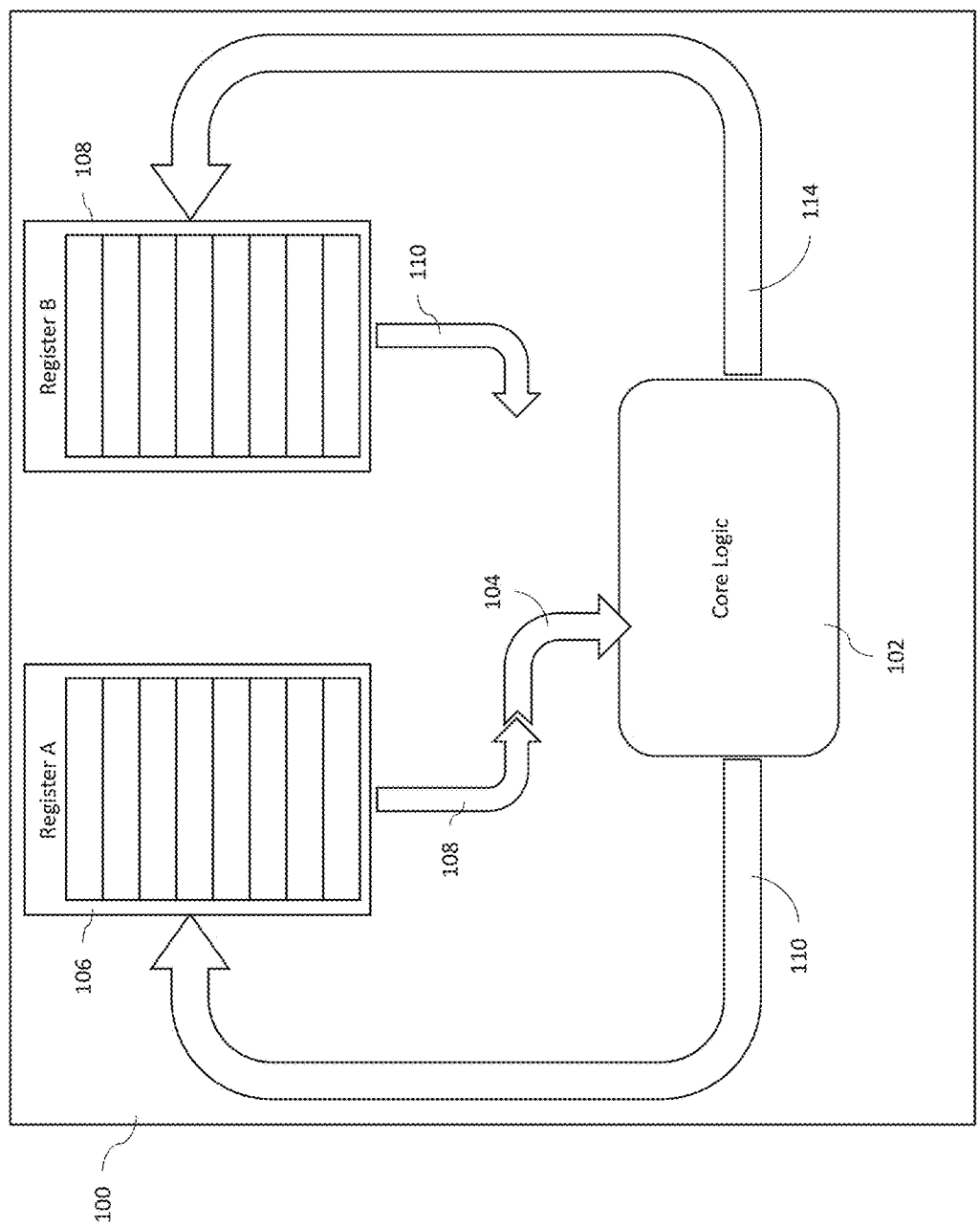
FIG. 1A is a simplified functional diagram of a single core microprocessor SMT system in a first configuration.
Figure 1B:
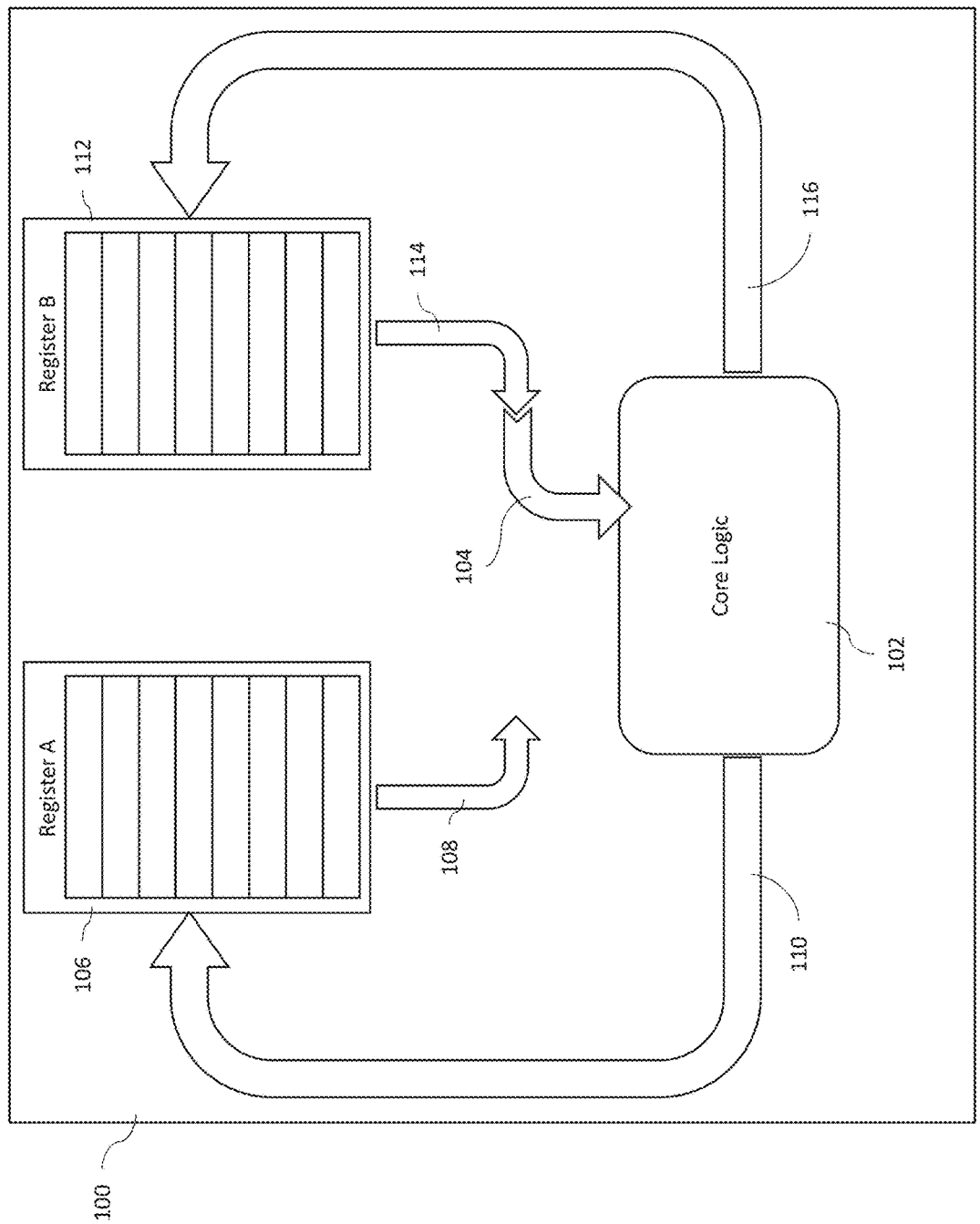
FIG. 1B is a simplified functional diagram of system of FIG. 1A in a second configuration.

The functionality of the system depicted in FIG. 2 is similar to that of the system depicted in FIGS. 1A and 1B, in as much as the information stored in virtual execution context memory 204 defines the state of processor 202. However, there are numerous critical advantages offered by system 200. For example, virtual execution context memory 204, being a software-defined construct within RAM is not comprised of fixed physical registers fabricated within a monolithic semiconductor structure housing a fixed core logic. Rather, execution context memory 204 is configured to have precisely enough capacity to contain the register context information 214 and paired memory context information 216 that define a given state of processor 202. "Right-sizing" the amount of RAM allocated for each of the associated registers, variable storage and/or environmental chains to define and support a particular state of processor enables the information contained in virtual execution context memory 204 to be accessed very efficiently. This right-sizing can be performed at run-time so as to dynamically define the amount of memory within the configurable random-access memory storage system designated for each of the registers, chains and variable stores within execution context 204.

For example, if defining a particular processor state required 1 Mbytes of parameter register context information 214, then 1M byte of space within random-access memory storage system would be designated for that purpose. Similarly, if 256 Kbytes of memory context information 216 was required to define a particular processor state, then 256 Kbytes of RAM would be designated for that purpose within virtual execution context memory 204. This permits processor 202 to access requisite information from execution context memory 204 without the inherent inefficiency introduced by a fixed physical register structure that is likely to have a capacity far in excess of what is required to support the register context information (214) or memory context information (216) required to define a particular processor state.

Register context pointer 208 within processor 202 provides the particular RAM address at which the register context information is stored. Similarly, processor 202's memory context pointer 210 provides the particular RAM address at which the memory context information is stored. The requisite context information is efficiently retrieved and processed, enabling processor 202 to efficiently assume a defined state and process an associated thread. This direct access of right-sized execution context information also permits processor 202 rapidly switch between one state or thread and another, offering greatly improved processor efficiency when compared to a conventional fixed register processor architecture.

The system and method disclosed above offer an additional advantage over conventional, fixed-in-silicon core and register processor architecture. In such conventional processor architecture, the stored memory context information relates to the entire platform. If such platform-wide information were to be breached, it could provide a basis for platform-wide unauthorized access and the compromising of all of the information associated with the platform. Contrastingly, the disclosed system and method utilize context pointers within a logical processor. These context pointers (register context, memory context, etc.) are not accessible outside of the execution context in which they reside. Furthermore, each pointer only provides direction to a specific RAM location and would not provide any indicia useful in attaining unauthorized platform-wide access. There is simply is no platform-wide information stored within the base registers. In fact, the architecture in the system described above fails to even have a platform that could be viewed as analogous (and therefore as vulnerable) to the physical semiconductor structure upon which present microprocessor technology is typically fabricated.

Figure 3:
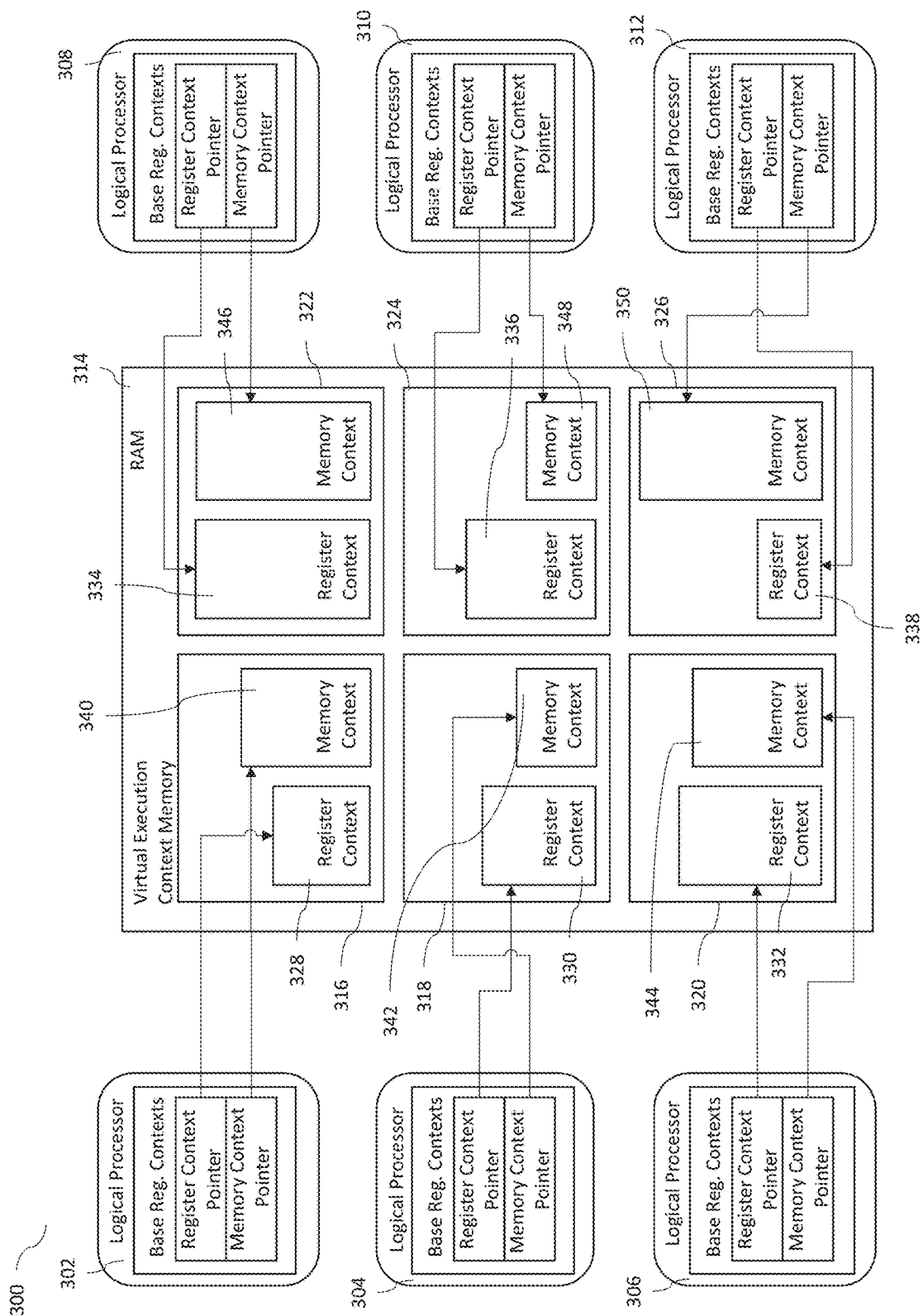
FIG. 3 is a functional block diagram of logical processor and memory arrangement supporting a preferred embodiment of a system and method utilizing dynamic register files.

Processor 202 can be a processor utilizing a single core system (similar to the processor depicted in system 100 of FIGS. 1A and 1B), or a processor employing a multi-core architecture. Each of the cores being capable of utilizing SMT or a similar strategy to perform as two or more logical processors, wherein the state of a given a logical processor would be defined by the accessed register context information and memory context information. A functional block diagram of one such multi-logic core system (300) is illustrated in FIG. 3. As shown, system 300 includes six logical processors (302-312) configured to access virtual execution context memory 314. These logical processors each include base register context information (316-326), which although critical to the operation of processor 202, typically reside outside of the physical package housing the processors logic core(s) so as to enable them to be utilized by other active execution processes.

Each of the logical processors (302-312) respectively accesses one pair of register context information 328-338 and memory context information 340-350 within virtual execution context memory 314. The logical processors then each execute the thread defined by the respective paired register and memory context information. As internal resources within a logical processor become available to accept instructions and data associated with a different thread, the logical processor can access alternate register and memory context information pairs within virtual execution context memory 314. For example, assume that resources within logical processor 302 become available after completing the processing of a thread that was defined by register context information 328 and memory context information 340. Virtual processor 302 could then be utilized to execute a thread defined by accessing register context information 330 and memory context information 342.

Figure 4:
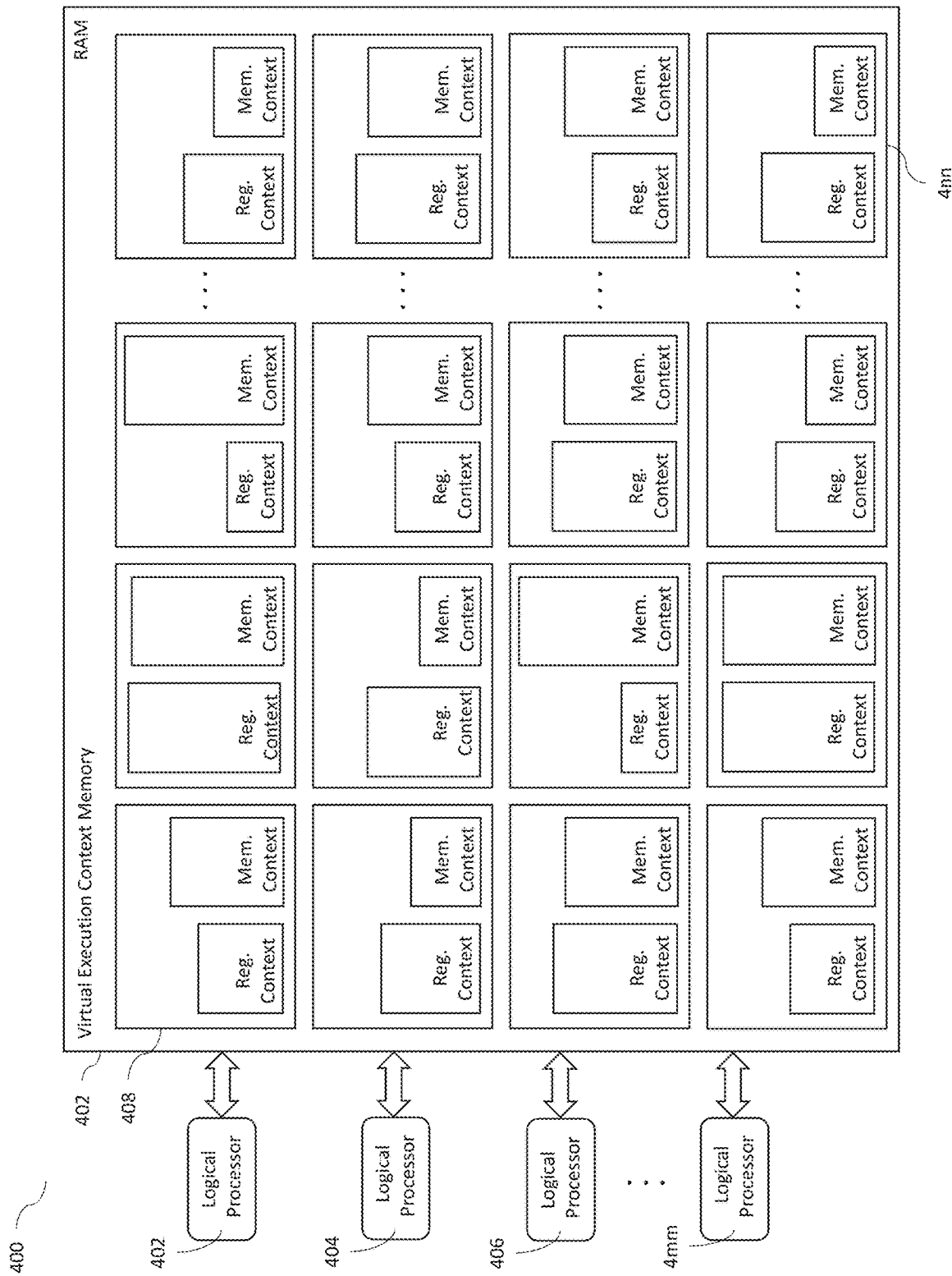
FIG. 4 is a functional block diagram of a system of multiple logical processors and a memory arrangement supporting an alternate preferred embodiment utilizing dynamic register files.

As previously stated, the paired register context and memory context information is stored within RAM, and consequently it will be understood that that the number of such pairings is limited only by the size of the available RAM. FIG. 4 provides a functional block diagram of a system (400) wherein virtual execution context memory 402 includes paired register and memory context information 408 through 4nn. These right-sized register and memory context pairings define a different processor state for processing a particular thread. Each of the register and memory context pairings is accessible by any one of logical processors 402-4mm, utilizing register and memory context pointer information stored within each logical processor. This enables any available resources within any one of the six logical processors to assume the state and execute the thread defined by any one the of the register and memory context pairings stored within virtual execution context memory 402.

Figure 5A:
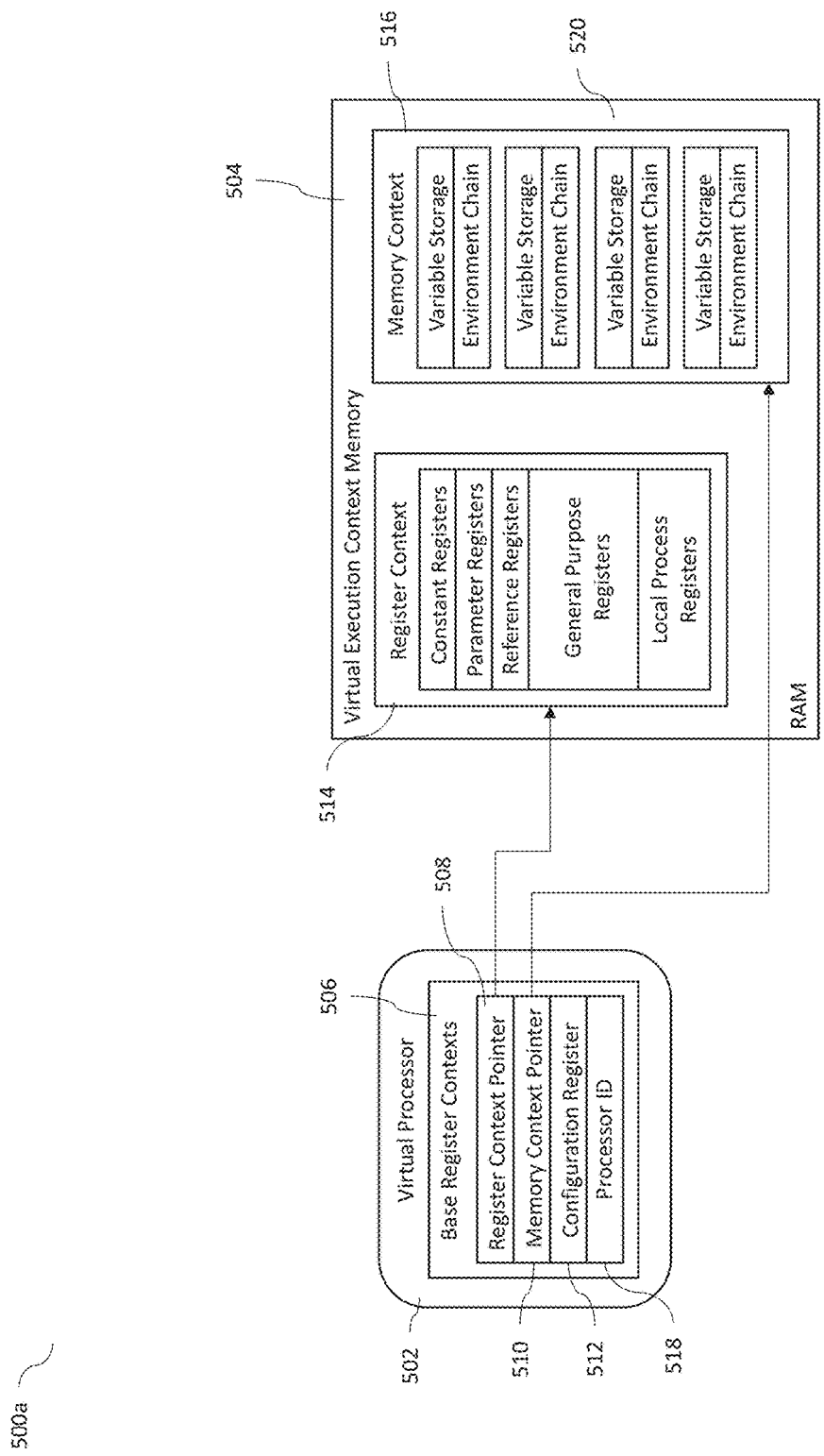
FIG. 5A is a functional block diagram of a virtual processor system and memory arrangement supporting an additional preferred embodiment utilizing dynamic register files.

An additional embodiment of the above system and method utilizes a virtual processor in conjunction with execution context memory. As shown in FIG. 5A, virtual processor system 500a is similar to the system depicted in FIG. 2. Virtual execution context memory 504 is a software-defined construct within RAM and configured at the initial run-time of a given process or program to have precisely enough capacity to contain the register context information 514 and paired memory context information 516 required to support the operations that will be executed over the entirety of the given process/program. Register context pointer 508 provides the particular RAM address at which the register context information is stored, and memory context pointer 510 provides the particular RAM address at which the memory context information is stored. However, unlike the system of FIG. 2, the processor (502) in which these context pointers reside is a virtual processor. Virtual processor 502 is comprised of information indicative of a register context pointer (508), a memory context pointer (510). Virtual processor 502 can also include other configuration register information (512) required to specify a given virtual processor state, as well as virtual processor identification information (518), which would serve to distinguish between individual virtual processors in systems employing multiple virtual processors. As with the virtual execution context information (514) of system 500a, the information comprising virtual processor 502 is stored within RAM (see FIG. 5B). The processor is effectively virtualized in a manner similar to that of a thread or processor state, and the virtual processor information is processed one or more logic cores as assets become available. In the system (500b) depicted in FIG. 5B, the information representing the virtual processor can be stored within the same RAM (520) utilized for storage of the virtual execution context information.

In all of the systems and methods that have been described, the state and configuration of the processor (be it virtual or otherwise) is defined at the run-time of a given process or program. That is, the number and types of registers, as well as the resources to support the requisite memory context, are defined so that the operations executed over the entirety of the given process/program will be supported. Although this specification of these resources is can be viewed as dynamic as it is a function of the particular resource requirements for a specific process/program, and will be redefined prior the execution of a new process/program by the virtual processor, the definition remains static throughout the execution of any given process or program.

Figure 6:
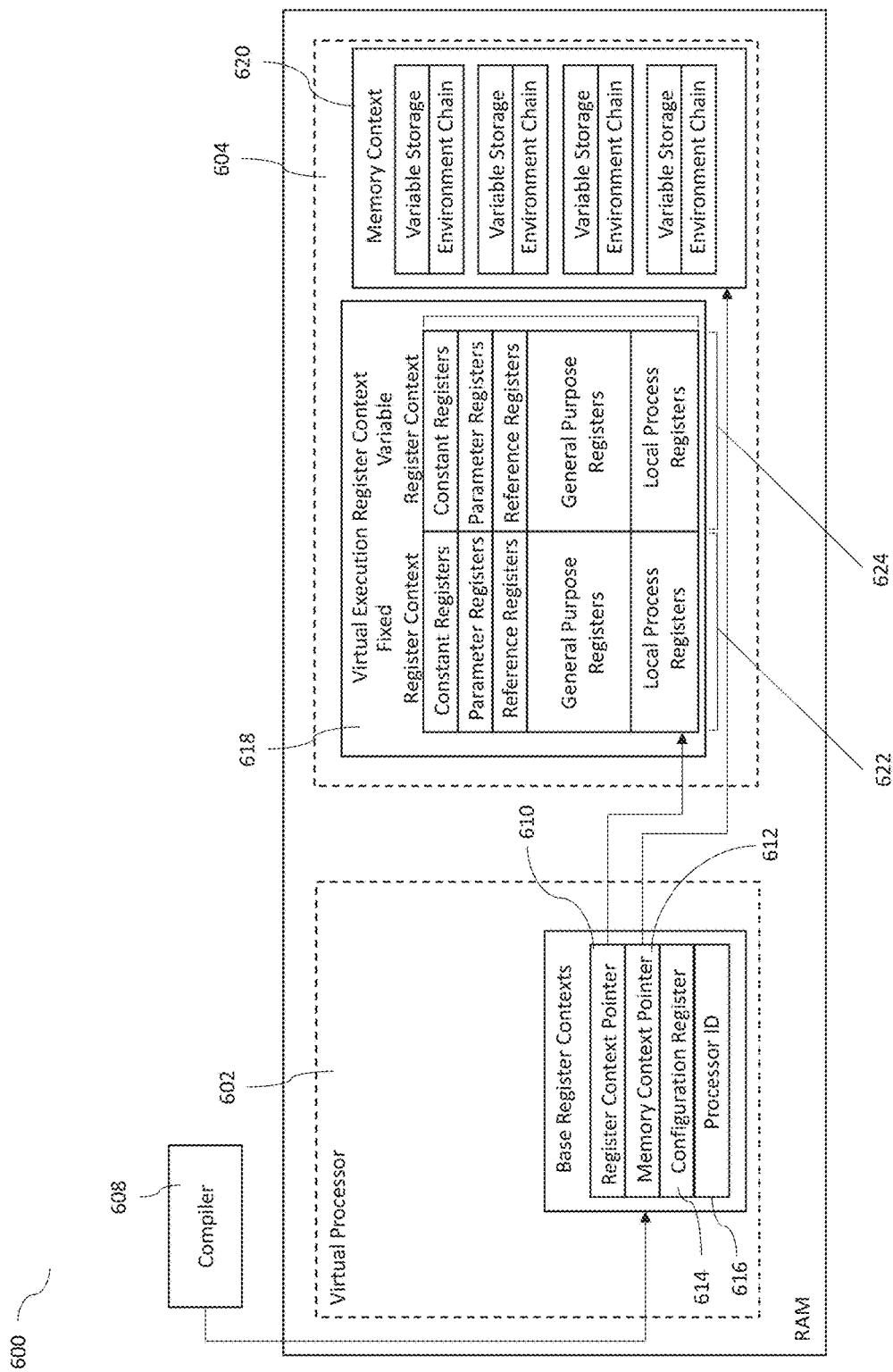
FIG. 6 is a functional block diagram of a virtual processor system and memory arrangement enabling software-controlled processor customization.

The embodiment of the invention illustrated in FIG. 6 provides for a system and method wherein the particular resources supporting a process/program are dynamically adjusted to accommodate the workload at any given point within a process/program. This effectively changes the very geometry of the virtual processor executing a process/program as a function of processor workload, thereby enabling execution efficiency and security to be further optimized.

Figure 5B:
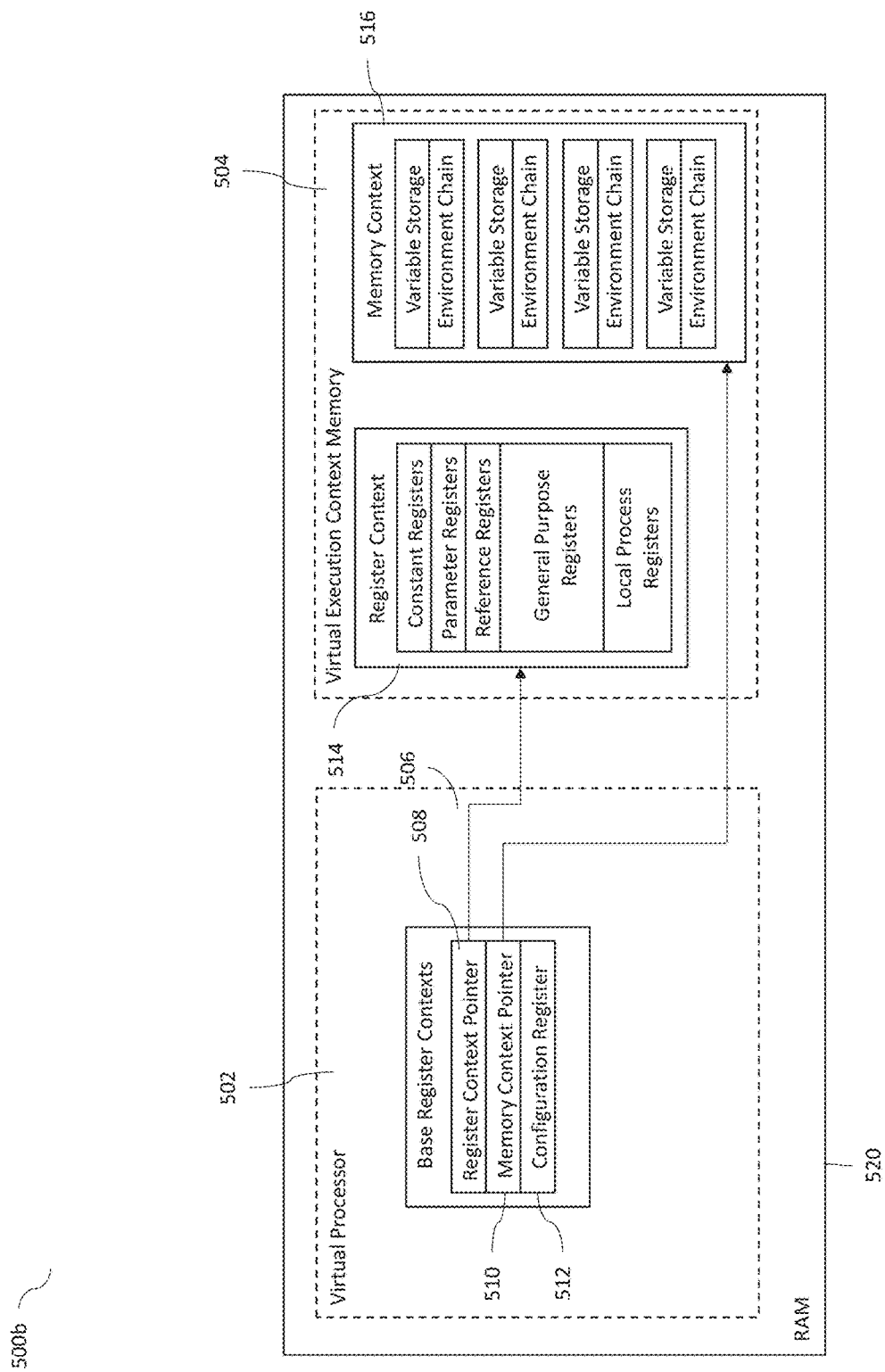
FIG. 5B is a functional block diagram of an alternate virtual processor system and memory arrangement supporting yet another preferred embodiment utilizing dynamic register files.

As shown, in FIG. 6, a system 600 includes virtual processor 602 and execution context memory 604. Virtual processor 602 is comprised of information indicative of a compiler (608), register context pointer (610), a memory context pointer (612). Virtual processor 602 may also include other configuration register information (614) required to specify a given virtual processor state, as well as virtual processor identification information (616), which would serve to distinguish between individual virtual processors in systems employing multiple virtual processors. Virtual execution context memory 604 is a software-defined construct within RAM and includes register context information 618 and paired memory context information 620 which support the operations that will be executed during a given process/program. The primary operation and interaction of the various components of system 600 are similar to the like-named components of system 500b (FIG. 5B). However, system 600 employs a compiler adapted to determine the precise number and size of the register resources required to support each instruction in the stream of instructions that comprises a given process/program. Compiler 608 is a software construct adapted to interpret a language source code, and emits a code file comprised of machine code targeted for a specific execution environment. The compiler can be resident in the same system that supports virtual processor 602 and/or execution context memory 604, or be supported by a wholly separate system.

The compiler in system 600 operates to provide a code file defining the specific execution environment for virtual processor 502. This code file would include at least one base instruction set ("IS 0"), enabling the initialization of the virtual processor. Compiler 608 is further adapted to provide one or more additional instruction sets so as to configure virtual processor 602 to support both fixed length (622) and/or variable (624) length virtual execution registers. As the compiler processes each instruction, it computes the optimal number, type and size of the registers required to support and execute that particular instruction, or subset of instructions comprising a given execution context with the overall process/program.

In a first embodiment, system 600 is utilized to allocate a set of fixed registers as a function of particular individual instructions within a given execution context. This could be implemented as a function of a single parameter indicative of the number of static registers to be allocated. In this embodiment, all registers are of a uniform size, and therefore the size is inherently known. So, an instruction could for example allocate 64 static registers, starting at register offset (O, and being continuous through register 63. These 64 registers remain allocated until the termination of the execution context. In a 32-bit processor system, the register width would most likely be 32 bits; in a 64-bit processor system, the register width would most likely be 64 bits.

System 600 could also be adapted to allocate multiple types of registers on the basis are allocated on the basis of particular individual instructions within a given execution context. As shown in FIG. 6, these registers can include general-purpose registers, constant registers, parameter registers, and reference registers. This allocation can be executed on the basis of an instruction comprised of a single parameter, A=15. This parameter would be interpreted by system 600 as specifying the allocation of 15 general purpose registers, 15 constant registers, 15 parameter registers, and 15 reference register. This makes for a compact and efficient instruction, but runs the risk of wasting register space for the register types that do not require the maximum count of 15.

An alternate methodology could employ an instruction having a more complex structure and specify the allocation use a form of A=(20, 50, 12, 30). This would be indicative of the allocation 20 general purpose registers, 50 constant registers, 12 parameter registers, and 30 reference registers. Each of these registers would be of identical width.

Yet another instruction schema suitable for use with system 600 supports the allocation of registers having unequal widths. For example, assume system 600 has a somewhat limited address space, but the capability to support large numeric representations. In such in architecture the width of a general-purpose registers, constant registers, and parameter registers would be large, such as 128 bits, while the reference registers storing addresses would be a more modest 32 bits. An allocation instruction of the form A=[(20, 128), (50, 128), (12, 128), (30, 32)] would result in the allocation of 20 128-bit general purpose registers, 50 128-bit constant registers, 12 128-bit parameter registers, and 30 32-bit reference registers. This amount of memory required to hold each register type being dictated by the register type itself. This optimizes the memory allocation for the register set, as the byte offsets to the registers can be easily calculated from the register number and register type, and maintains a consistent instruction set register numbering scheme across all register types.

The allocation instruction could also be of a format that specified the register width along with the register type, so as to provide an even more dynamic and flexible use of register memory. For example, many machine learning programs utilize a 16-bit arithmetic width to support high-speed calculations while sacrificing a certain degree of accuracy. In executing such a program, an architecture could be allocated to permit general-purpose, constant, and parameter registers to be of varying widths. An allocation instruction of A=[[(20 64), (20 16)], [(25 64), (25 16)], (12 64), (30 64)] would be indicative of the following register configuration:

20 64-bit general purpose registers;
20 16-bit general purpose registers;
25 64-bit constant registers;
25 16-bit constant registers;
12 64-bit parameter registers; and
30 64-bit reference registers.

The specific execution context supported by the specified registers being precisely configured for the machine learning task at hand.

An alternate allocation command sequence of four separate instructions wherein each one specified type, quantity and width of the requisite registers could also achieve the same end result. For example:

A=0 20 64,0 20 16;
A=1 25 64 25 16;
A=2 12 64; and
A=3 30 64.

In this instruction format, the first number of the ASRS instruction delineates the type; 0=General Purpose, 1=Constant, 2=Parameter, 3=Reference.

It should also be understood that although the register allocation systems, parameters and processes described above were focused upon providing the allocation of particular registers having a type and a size (width) based primarily upon optimizing the execution of particular instructions within a given execution context, the inherent security aspects provided by such are significant. The very nature of the register allocation system and processes discussed above is dynamic in the time domain. Any state or information available at a given time is transient. An external entity observing or accessing this dynamic system (perhaps without permission) would be observing what would appear to be an unstable system, presenting information that appeared to vary randomly in size and location. Without the proper context for a given state of the dynamic system (which would be wholly unavailable to an unauthorized third party), the information would likely yield little or no discernable intelligence with respect to the process being executed. The inherent security aspects of this dynamism are obvious. Consequently, utilization of such a system could be motivated in whole or in part by the provision of a secure virtual environment for the execution of particularly sensitive or private processes.

The inherent security afforded by the transient and context-specific nature of the register allocation described above can be leveraged to provide increased security for information beyond the bounds of the data that is traditionally stored in processor registers. Typically, processor registers are used primarily for data, as opposed to instruction code. Although there is an instruction pointer in conventional processor register systems, this pointer typically provides a platform memory address at which the processor (physical or virtual) can prefetch a limited number of code bytes which can then be decoded, scheduled, and executed. The large register set afforded by the architecture and processes disclosed above makes it feasible to store significant portions, or even the entirety, of private instruction code in the register domain. This here-to-fore unavailable departure from traditional processor design benefits from the security provided by the registers within the execution context. Code stored within such is not visible to any entity or process other than the particular program which is associated with the execution context. This makes having the ability to direct the instruction pointer to a register address internal to the processor register set, as opposed to an address within a platform memory, a significant enhancement for the protection of critical data such as instruction code and/or encryption keys. The capability for the processor to take instructions linearly from a contiguous set of internal registers, and to freely switch from code in memory to code in registers, and back again, brings a new, enhanced level of capability to compilers to further optimize processor architecture and state for a given workload or task.

For example, in a particular embodiment, the compiler (608) would be utilized to recognize particular code as representing instructions, or sets of instructions, that should be afforded an elevated level of security. Upon recognition of such, the compiler would responsively create code bytes representing the particular code (in accordance with a predetermined algorithm) and store such within the execution context registers (618). This recognition could be based upon a predetermined set of parameters, or upon a marker within the particular code. Once the created code bytes were resident within the execution context registers, the compiler would be adapted to utilize the code bytes as process instructions. This morphing of the information stored within the execution register(s) from data to executable code can be characterized as a self-modifying code, wherein the initial code relies upon other private registers to control the code modifications. The transient nature of code bytes stored in the execution context registers, in conjunction with the predetermined algorithm utilized by the compiler to create the code bytes would serve to make reverse engineering, or otherwise attempting to compromise the store code bytes extremely difficult for any unauthorized party that lacked the contextual information necessary to properly recognize and interpret the code bytes. Thus, the instant invention enables a compiler to not only optimize processor performance, but also optimize a process' or program's security.

One manner of constructing the value of the pointer referencing the instruction code within the execution context memory utilizes a form of [Area Descriptor ("AD")+offset]. This [AD+offset] structure provides for further enhancing the security of the instruction code. The AD describes a register area, but the actual physical address is hidden from the application layer. The instructions leverage the physical address during execution, but the programs themselves have no way of knowing where they are located. Their knowledge is limited to their offsets within a segment. Without knowledge of where the base of the segment is, one cannot discern what the addresses spanned by the area descriptor are. This model is valid even when the pointer is referencing code within internal registers as described above. In this case, the AD refers to the case of the segment containing the memory in which the registers containing the code are embodied. In both cases, a simple reference is suitable to describe the Instruction Pointer.

The emerging technology of vertically-integrated flash memory, also known as three-dimensional cross-point or 3D X-Point memory, which because if it's memory density and speed presents a particularly attractive environment for the storage of private instruction code in the register domain. This type of memory also offers the advantage of non-volatile storage of information, thereby provides an area of persistent private memory which can be allocated like any other register file data, but which will be provide for the persistent and secure storage of information (instruction code). Although the storage is persistent, it remains available only to the process which is executing within the confines of this specific processor. This provides a significant enhancement for the generation, storing, and retrieval of encryption keys and instruction code. As described above, a non-volatile 3D X-point memory could serve as a secure private disk which can only transfer data to/from the secure register file accessible only within a particular process environment. In order to prevent unauthorized restoration of a preserved key-value pair, higher levels of software could be required to assure that the act of requesting restoration, has been validated via guiding principles of a given implementation.

Figure 7A:
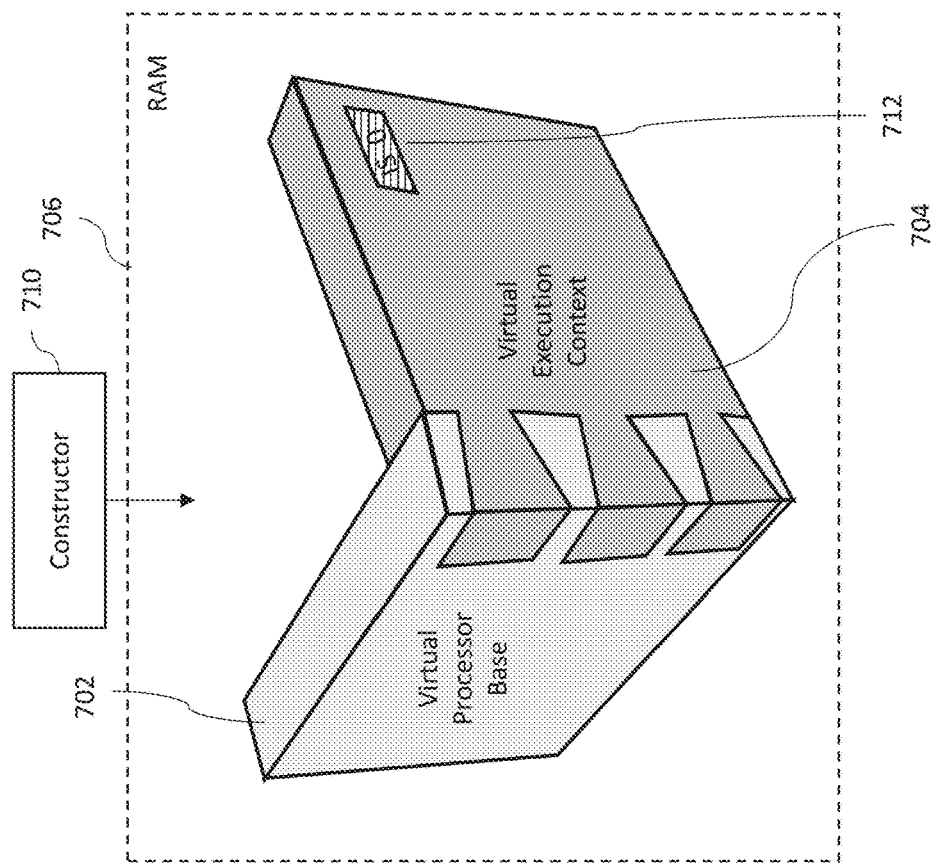
FIG. 7A is a functional block diagram of a virtual processor base/virtual execution context arrangement.

In a virtual processor system, such as system 600 of FIG. 6, the virtual processor can be conceptualized as split into two separate components: a virtual processor base 702 ("VPB"), and a virtual execution context ("VEC") within a random-access memory (706) (see FIG. 7A). Both the VEC and the VPB are typically represented as objects comprised of parameters aggregated and arranged by a constructor (710). This constructor, not unlike the compiler of system 600, is a software construct. Constructor 710 is adapted to configure virtual processor components, and can be resident in the same system that supports virtual processor and/or execution context memory, or can be supported by a wholly separate system. The particular parameters comprising the virtual processor components may include initial static register configuration, initial dynamic register configuration, along with other context information.

Upon creation of the VPB, the VPB is supplied with the necessary boot-strap instruction for the initiation of VEC execution. This instruction can be as simple as an address that the VPB's instruction pointer needs to point to the location of the required bootstrap code needed by the VEC to begin execution. However, it can prove advantageous to have the VPB also provide the code that the instruction pointer needs to point to in order to execution the bootstrap. The VPB points back to itself to obtain the initial code for execution. The VPB is initially self-sufficient.

In the simplest form a VEC could be constructed so as to comprise only of a base instruction set, IS 0 (712), to enable the initialization of the virtual processor. No specification of register allocations need be provided. Upon the VPB attaching to this base VEC (see FIG. 7B), the first instructions executed would be those allocating the memory used for the processor workload contexts. The code provided by the system compiler could then dynamically reconfigure the BPB and/or VEC so as to optimize it for executing particular code. The compiler would have determined, during compilation, which values are to be kept in the register context, both static and dynamic, as well as what values need be kept in the memory context.

Secure items which are stored within the register context are only visible when the execution context is active and can only be manipulated by the instructions the virtual processor executes. As long as the VEC can refer to the next instruction via an instruction pointer, the boot process can continue, supported by the VPB instructions allocating the required resources prior to the memory being used.

Figure 7B:
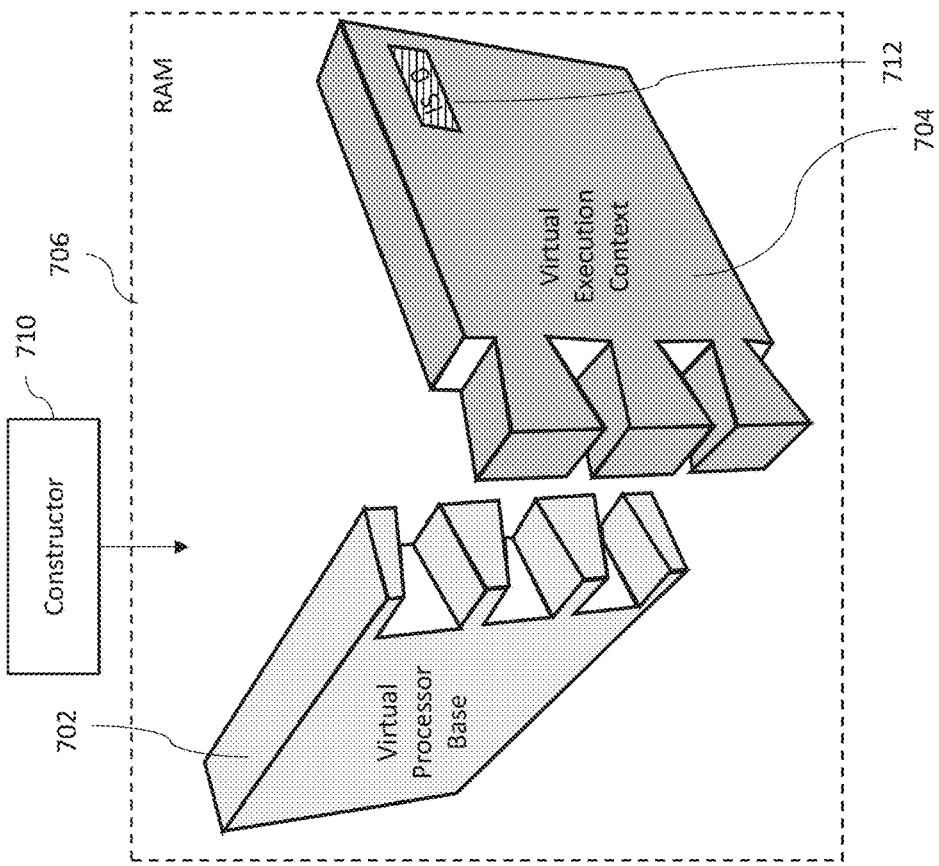
FIG. 7B is a functional block diagram of the virtual processor base/virtual execution context arrangement of FIG. 9A in an attached state.
Figure 8A:
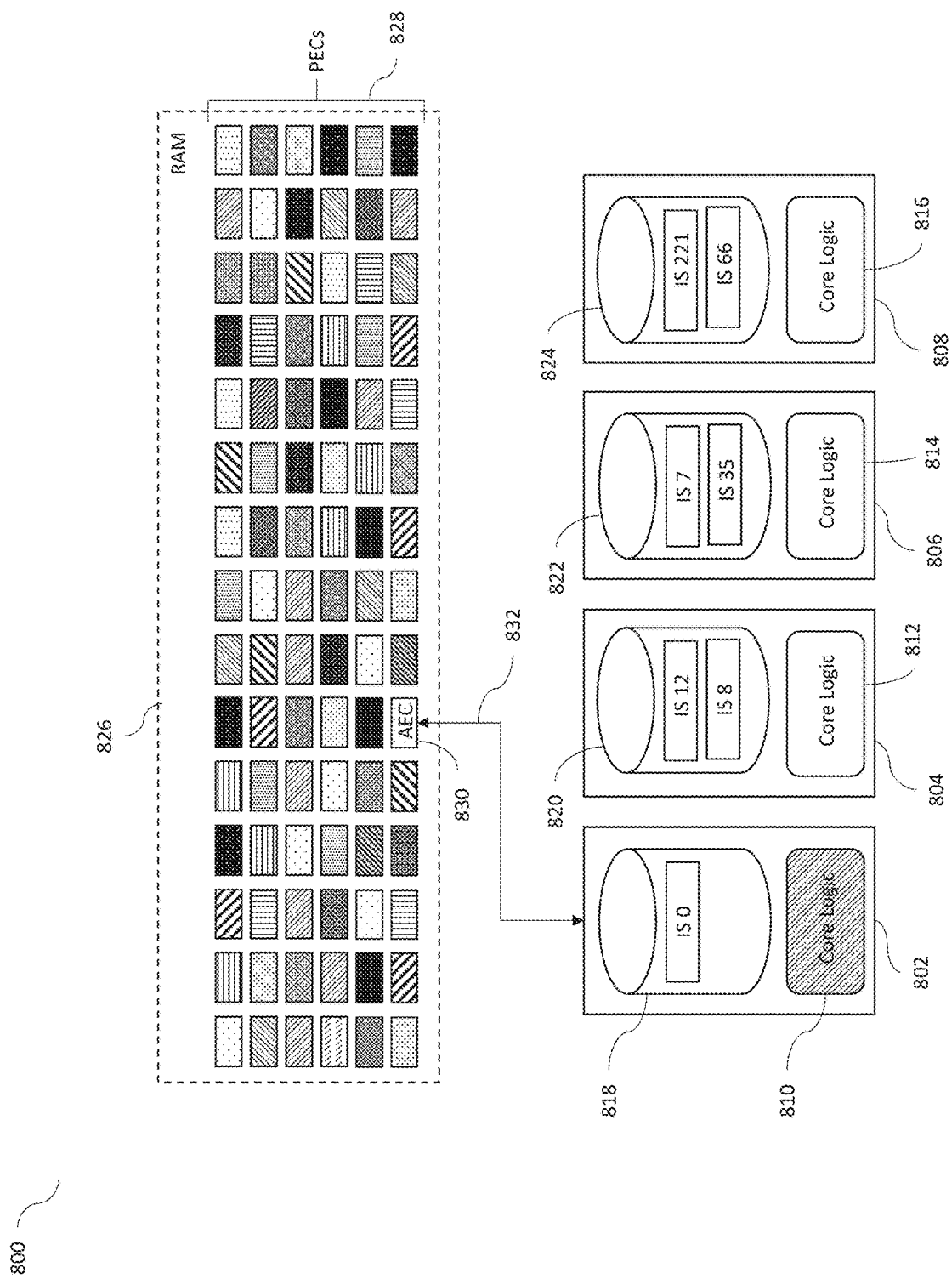
FIG. 8A provides a functional block diagram of a first system utilizing chiplets and physical execution contexts.

FIG. 8A provides a functional block diagram of a physical system 800 that supports processes that share many aspects with the VPB/VEC system depicted in FIGS. 7A and 7B. System 800 includes four specialized integrated circuits or "chiplets" (802, 804, 806, and 808), each of which includes a core logic (810-816) and an associated core memory (820-824) storing one or more instruction sets (IS 0, IS 12, IS, 7, etc.). It also includes RAM 826 storing information representing 90 dissimilar physical execution contexts ("PECs") (828). Each PEC contains information similar to that found in the previously described VECs, but does not contain any instruction sets. Unlike the systems depicted in FIGS. 8A-C, system 800 is adapted to provide a switchable connection serially linking an active execution context ("AEC") with a multiplicity of chiplets. As shown, AEC 830 is switchably linked (832) with chiplet 802, allowing the process/thread of AEC 834 to utilize the logic core 810 and execute IS 0. As with system 800, IS 0 is a base set of instructions that enables the processor to initialize and then process other instructions.

Figure 8B:
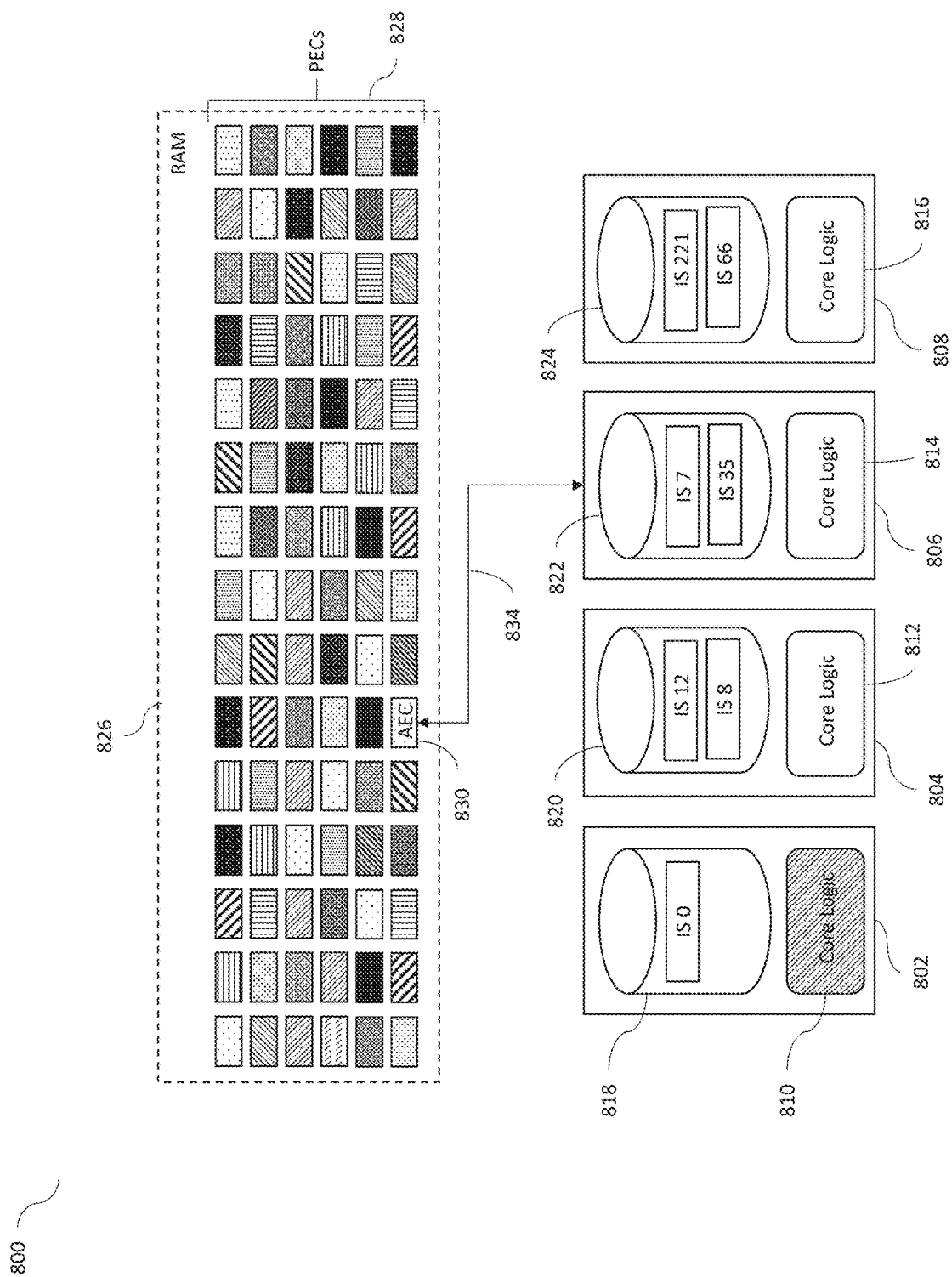
FIG. 8B provides a functional block diagram depicting the system of FIG. 8A in a second state.

As depicted in FIG. 8B, after executing IS 0 and initializing, AEC 830 establishes a switchable link (836) to chiplet 806 and executes IS 35 via core logic 814. Accessing a different chiplet allows AEC 834 to utilize an entirely different logic core, and therefore permits access to task-specific logic architecture. For example, if IS 35 executed a video-related process, core logic 814 could be specifically adapted for image and graphical processing. Following the execution of IS 35, the thread specified by AEC 834 could then continue, perhaps establishing a switchable link (836) to chiplet 808 and executing IS 66 via core logic 822 (see FIG. 8C). Again, core logic 816 could be specifically adapted to execute the particular type of processing that IS 66 (and IS 221) require.

Chiplet architecture, such as that described above with respect to system 800, and the physical compartmentalization of task-specific architecture that such an architecture provides offer an inherent task-specific level of security. If a particular process requires a specific chiplet to be available to a core processor, the lack of such a chiplet would prohibit that particular task from being executed by the core processor (be it physical or virtual). This chiplet-enforced security is particularly suited for providing security or safeguards with respect to debugging processes.

A debugging process by its very nature presents certain obvious security threats. To properly and fully debug a software or processor environment, the debugging process must be given access to the entirety of the executable contexts associated with a given processor or processors being debugged. Obviously, such global access by any single process or entity would likely have serious security implications, and likely violate any number of security protocols intended to protect against unwanted intrusions and hacking.

Figure 8C:
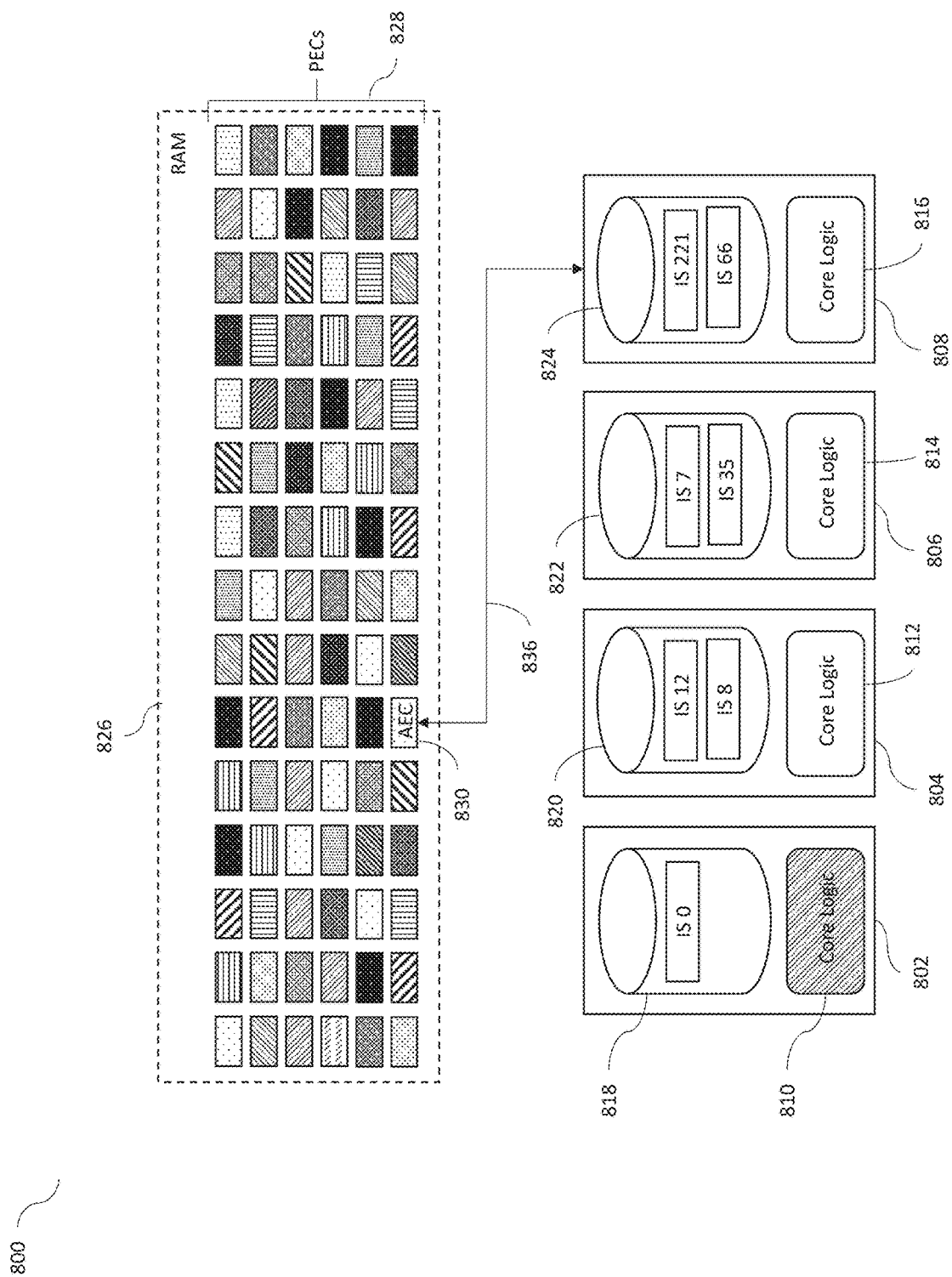
FIG. 8C provides a functional block diagram depicting the system of FIG. 8A in a third state.
Figure 9A:
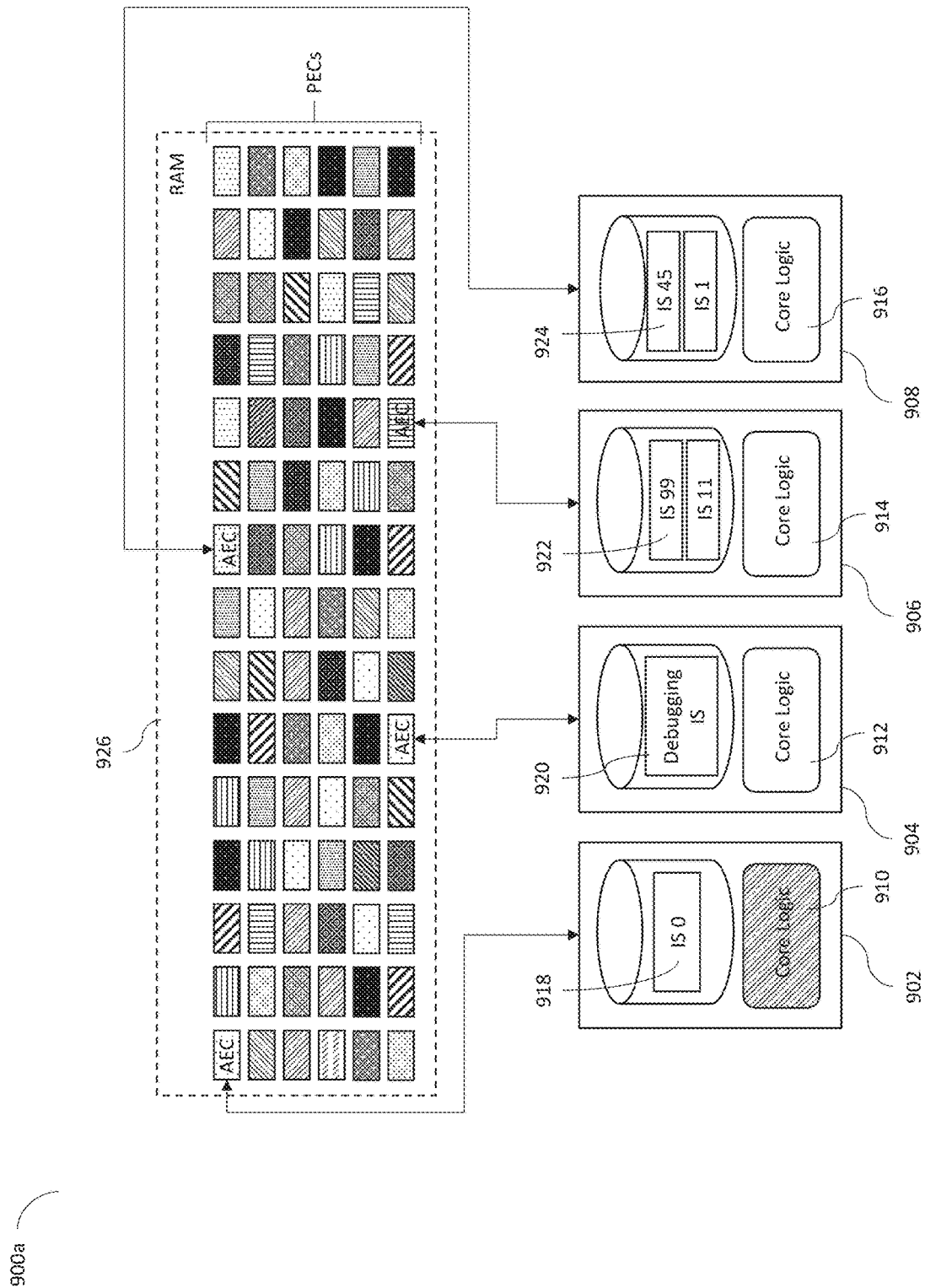
FIG. 9A provides a functional block diagram of a second system utilizing chiplets and physical execution contexts.

Referring to FIG. 9A a system, 900, is depicted in which is quite similar to system 800 of FIGS. 8A-C. As shown, system 900 includes four specialized chiplets (902, 904, 906, and 908), each of which includes a core logic (910-916) and an associated core memory (918-924) adapted for the storage of one or more instruction sets (IS 0, IS 99, IS 11 etc.). It also includes RAM 926 storing information representing 90 dissimilar physical execution contexts ("PECs"). Each PEC contains information similar to that found in the previously described VECs, but does not contain any instruction sets. As with system 800, system 900 is adapted to provide a switchable connection serially linking an active execution context ("AEC") with a multiplicity of chiplets. A distinctive feature of system 900 is the debugging instruction set within core memory 920 of chiplet 904. This instruction set comprises a collection of instructions and permissions that enable chiplet 904 to execute processes required to debug the entirety of the depicted processor system.

Figure 9B:
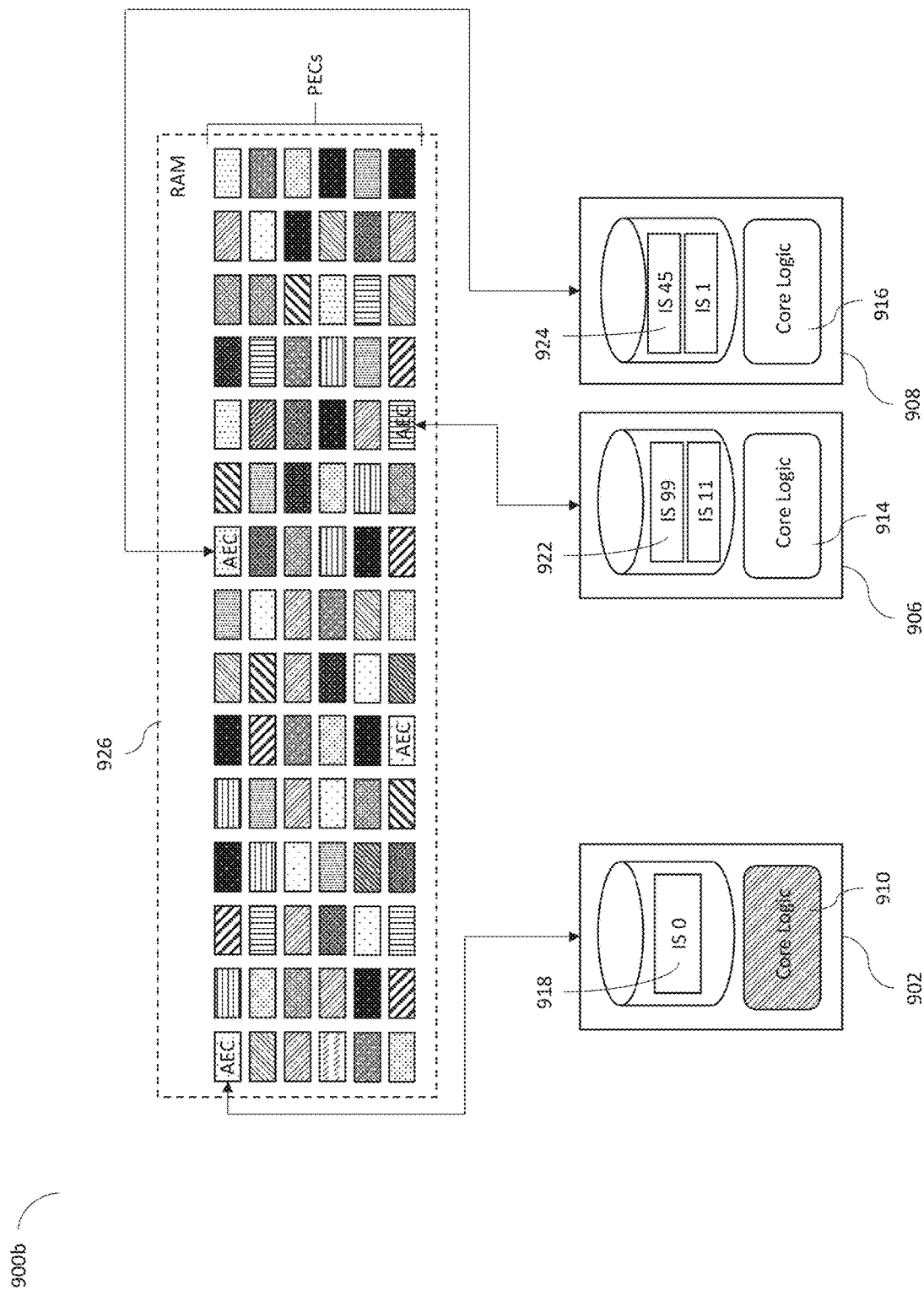
FIG. 9B provides a functional block diagram depicting a third system utilizing chiplets and physical execution contexts.

As mentioned above, the global access required to support a debugging process can give rise to a number of security concerns, and the instructions chiplet 904 could indeed rightfully be viewed as putting all of the processes handled by system 900 at risk. Consequently, if the processes being carried out in accordance with the instructions found in chiplets 906 and 908 are classified as sensitive, such as information related to high-energy physics or military information, a user of the system might choose not to have a debugging chiplet included in system (see system 900b of FIG. 9B). As all debugging instructions are entirely contained within the debugging chiplet (904), if such a chiplet was not included in the build of system 900, the resultant system would be inherently more secure.

Figure 9C:
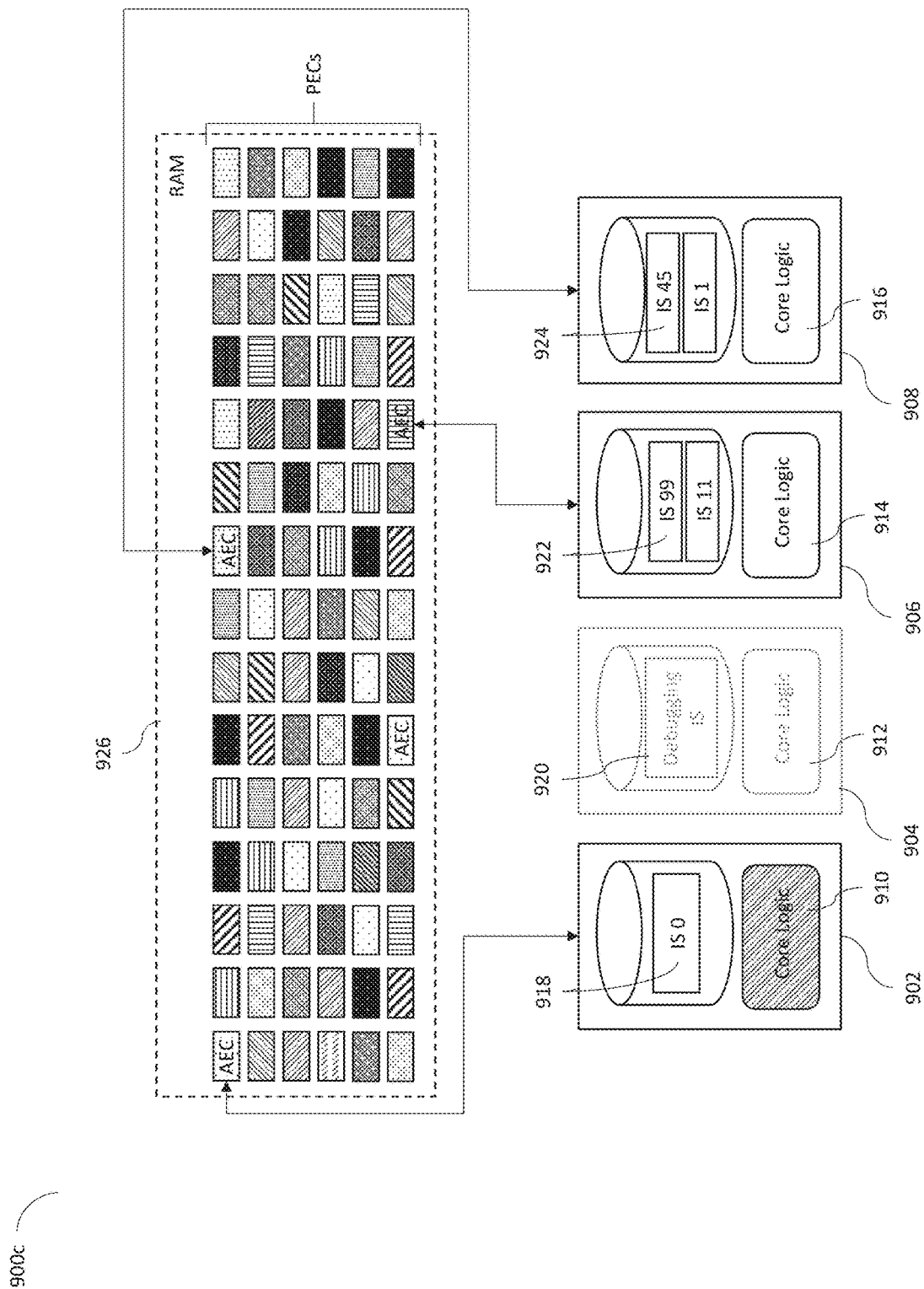
FIG. 9C provides a functional block diagram depicting a fourth system utilizing chiplets and physical execution contexts.

Rather than excluding a debugging chiplet from the system, which could require a custom build and therefore increase costs or complicate the production of physical systems embodying systems such as system 900, the debugging chiplet could be provided in all such systems, but simply not enabled (see system 900c of FIG. 9C). As shown, chiplet 904 is included within the depicted system, but no connection to RAM 926 nor access to instruction set 920 is provided. By not providing the requisite instructions (firmware) within system 900c to access chiplet 904, the security short-comings of system 900a are avoided.

If a user decided that they wanted to access the debugging capabilities of chiplet 904 within system 900c at some juncture, the chiplet could be accessed if the proper instruction set was added to system 900c. This could be done by downloading and applying a firmware update. System 900c could also be adapted to detect any activation of chiplet 904, and responsively prohibit any chiplets being accessed and therefore processes being executed. This type of shutdown response would provide enhanced security against any unauthorized access and activation of the debugging instruction set within a system that was designated as never being subject to such global processor access.

Although the invention herein has been described with reference to particular embodiments, it is to be understood that these embodiments are merely illustrative of the principles and applications of the present invention. For example, the invention could be implemented utilizing a variety of physical topologies and circuitry. It could be implemented in a monolithic architecture, or across a number of interconnected discrete modules or circuit elements, including elements linked by means of a network.

The invention claimed is:

1. A processing system comprising:
a plurality of discrete processing arrangements, each comprising a core memory and an associated core logic, the core memory adapted to store at least one set of executable instructions, and an associated core logic, comprised of at least one processor and adapted to execute the set of executable instructions; and
at least one physical execution context stored in a specific portion of an addressable memory and comprised of information indicative of a particular processor state and at least one pointer to at least one of the plurality of discrete processing arrangements, wherein the capacity of the specific portion of the addressable memory storing the physical execution context is based upon a memory space required to store the information indicative of a particular processor state and the at least one pointer, wherein the physical execution context is adapted to:
link to at least one particular discrete processing arrangement based upon the at least one pointer, wherein the at least one particular processing arrangement comprises an associated core logic adapted to provide debugging instructions enabling the debugging of the processing system.

2. The system of claim 1 wherein the at least one pointer is adapted to sequentially point to more than one of plurality of discrete processing arrangements based upon the physical execution context.

3. The system of claim 1 wherein the addressable memory comprises at least one of the following:
static random-access memory;
dynamic random-access memory;
a three-dimensional cross-point memory; and
non-volatile memory.

4. The system of claim 1 wherein the specific portion of the addressable memory has a capacity equal to a minimum memory space required to store the physical execution context.

5. The system of claim 1 wherein the at least one set of executable instructions comprises instructions for processor initialization.

6. The system of claim 1 wherein the at least one particular discrete processing arrangement is disabled thereby prohibiting access to instructions enabling the debugging of the processing system.

7. The system of claim 6 wherein the disabling of the particular discrete processing arrangement comprises prohibiting the at least one pointer from pointing to an instruction set associated with the particular discrete processing arrangement.

8. The system of claim 6 wherein the at least one particular discrete processing arrangement is selectively enabled by the provision of a new instruction set.

9. The system of claim 8 wherein the provision of a new instruction set comprises firmware.

10. A method for the provision of enhanced processor security, in a system comprising:
   a plurality of discrete processing arrangements, each comprising a core memory and an associated core logic, the core memory adapted to store at least one set of executable instructions, and an associated core logic, comprised of at least one processor and adapted to execute the set of executable instructions; and
   at least one physical execution context stored in a specific portion of an addressable memory and comprised of information indicative of a particular processor state and at least one pointer to at least one of the plurality of discrete processing arrangements, wherein the capacity of the specific portion of the addressable memory storing the physical execution context is based upon a memory space required to store the information indicative of a particular processor state and the at least one pointer;
the method comprising the step of:
   linking to at least one particular discrete processing arrangement based upon the at least one pointer; wherein the at least one particular processing arrangement comprises an associated core logic adapted to provide debugging instructions enabling the debugging of the processing system.

11. The method of claim 10 wherein the at least one pointer is adapted to sequentially point to more than one of plurality of discrete processing arrangements based upon the physical execution context.

12. The method of claim 10 wherein the addressable memory comprises at least one of the following:
   static random-access memory;
   dynamic random-access memory;
   a three-dimensional cross-point memory; and
   non-volatile memory.

13. The method of claim 10 wherein the specific portion of the addressable memory has a capacity equal to a minimum memory space required to store the physical execution context.

14. The method of claim 10 wherein the at least one set of executable instructions comprises instructions for processor initialization.

15. The method of claim 10 further comprising the step of:
   disabling the at least one particular discrete processing arrangement and thereby prohibiting access to instructions enabling the debugging of the processing system.

16. The method of claim 15 wherein the step of disabling of the particular discrete processing arrangement comprises prohibiting the at least one pointer from pointing to an instruction set associated with the particular discrete processing arrangement.

17. The method of claim 15 further comprising the step of providing a new instruction set to selectively enable the at least one particular discrete processing arrangement.

18. The system of claim 17 wherein the new instruction set comprises firmware.

* * * * *